United States Patent [19]

Nishiyama et al.

[11] Patent Number: 5,141,668
[45] Date of Patent: Aug. 25, 1992

[54] NAPHTHALENE COMPOUND AND LIQUID CRYSTAL COMPOSITION CONTAINING THE SAME

[75] Inventors: Shinichi Nishiyama; Hideo Yamaoka; Tooru Yamanaka, all of Ichihara, Japan

[73] Assignee: Mitsui Petrochemical Industries Ltd., Tokyo, Japan

[21] Appl. No.: 347,750

[22] Filed: May 5, 1989

[30] Foreign Application Priority Data

May 12, 1988 [JP] Japan .................. 63-115093

[51] Int. Cl.⁵ .............. C09K 19/32; C09K 19/52; C07C 69/76
[52] U.S. Cl. .............. 252/299.62; 252/299.01; 560/80; 560/85
[58] Field of Search .......... 252/299.01, 299.6, 299.61, 252/299.62; 560/100, 54, 59, 63, 65, 83, 85, 86

[56] References Cited

U.S. PATENT DOCUMENTS

| | | | |
|---|---|---|---|
| 4,119,558 | 10/1978 | Coates et al. | 252/299 |
| 4,820,839 | 4/1989 | Krause et al. | 544/316 |
| 4,846,998 | 7/1989 | Pohl et al. | 252/299.63 |
| 4,867,904 | 9/1989 | Krause et al. | 252/299.62 |
| 4,871,471 | 10/1989 | Krause et al. | 252/299.65 |
| 4,873,019 | 10/1989 | Krause et al. | 252/299.61 |
| 4,904,752 | 2/1990 | Kanoe et al. | 528/97 |
| 4,921,632 | 5/1990 | Nakamura et al. | 252/299.1 |
| 4,973,738 | 11/1990 | Suzuki et al. | 560/80 |

FOREIGN PATENT DOCUMENTS

| | | |
|---|---|---|
| 294852 | 12/1988 | European Pat. Off. |
| 332456 | 9/1989 | European Pat. Off. |
| 0339987 | 11/1989 | European Pat. Off. |
| 339987 | 11/1989 | European Pat. Off. |
| 62-10045 | 1/1987 | Japan |
| 63-246346 | 10/1988 | Japan |
| 1-128954 | 5/1989 | Japan |
| 8706577 | 11/1987 | PCT Int'l Appl. |

Primary Examiner—Robert L. Stoll
Assistant Examiner—Sheam C. Wu
Attorney, Agent, or Firm—Nixon & Vanderhye

[57] ABSTRACT

A naphthalene compound having the following formula (I) and a liquid crystal composition containing the same:

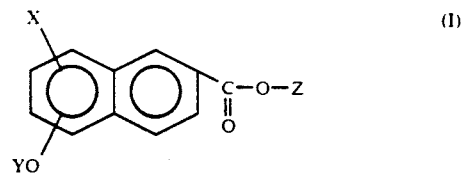

wherein X represents a hydrogen atom or a halogen atom, Y and Z independently represent a monovalent group selected from the group consisting of

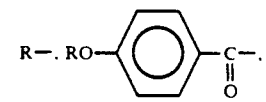

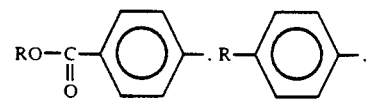

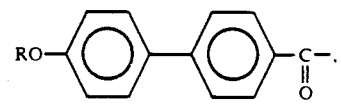

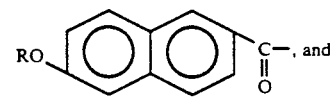

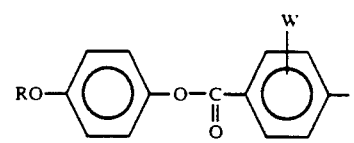

wherein W represents a hydrogen atom or a halogen atom, R represents an alkyl group having 6 to 18 carbon atoms, provided that Y and/or Z represent the alkyl group, which is an optically active group including an asymmetric carbon having the following formula (II):

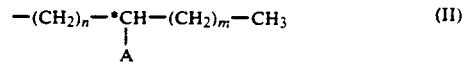

wherein A is a group or atom selected from the group consisting of alkyl groups, alkoxy groups, halogen atoms and fluoroalkyl groups, n is an integer of 0 to 3, m is an integer of 3 to 6, and *C represents an asymmetric carbon.

2 Claims, No Drawings

NAPHTHALENE COMPOUND AND LIQUID CRYSTAL COMPOSITION CONTAINING THE SAME

BACKGROUND OF THE INVENTION

1. Field of the Invention

The present invention relates to a novel naphthalene compound and a liquid crystal composition containing the same. More specifically, the present invention relates to a novel naphthalene compound having an optically active group and a liquid crystal composition containing the same.

2. Description of the Related Art

In the prior art, CRT devices are most frequently used as display devices for OA instruments, and in the field of instruments having display devices such as OA instruments, there is an increasing demand for a miniaturization and reduction of the weight of these instruments, or an enlargement of the picture area and a reduced thickness of the picture unit of the display devices. Accordingly, to meet the respective usages and demands the CRT devices of the prior art have been replaced by various newly developed display devices, for example, liquid crystal display, plasma display, LED display, EL display, and ECD display devices.

Among these display devices, the liquid crystal display device sends electric signals to a switching element basically by using a liquid crystal compound to change the state of the liquid crystal compound in the switching element, to thereby control the shielding and transmission of light to elicit electric signals, and is practically applied not only as a display device for the OA instruments as mentioned above, but also as a display device for digital watches or portable games, etc., and further, is now used as a display device for moving pictures, such as for a small television receiver.

In the display device using a liquid orystal compound as described above, various drive systems are known, for example, the TN (twist nematic) mode is used as the drive system for current liquid crystal display devices. The TN mode is a system which obtains a display by utilizing the dielectric anisotropy of the molecules in the nematic phase of the liquid crystal compound, whereby the display device is driven by the energy in proportion to the square of the electrical field externally applied ($f\alpha E^2$).

In switching elements employing this system, however, to change the displayed picture the position of the molecules of the liquid crystal compound must be changed, and therefore, the drive time is prolonged and a problem arises in that the voltage required for changing the molecule position of the liquid crystal compound, namely the consumption power, becomes greater. In such a switching element, since the switching threshold value characteristic is poor, when switching actuation is attempted by changing the molecular position at a high speed, a leak voltage occurs even at non-display picture portions, whereby the display contrast is often remarkably lowered.

Accordingly, the display system using the TN mode of the prior art is not always an appropriate display device system for displaying moving pictures, particularly as a display device having a large picture area or for a miniature digital television receiver.

A display device utilizing STN (super twist nematic) having an improved switching threshold value characteristic as the TN mode is also used, and by utilizing the STN mode, the switching threshold value characteristic can be improved, and thus the contrast of the display device can be improved. Nevertheless, this method is the same as the TN mode in that it utilizes a dielectric anisotropy, and therefore, the switching time is prolonged and the same tendency as that of the display device utilizinq the TN mode is exhibited when it is used as a display device for moving pictures, particularly a display device having a large picture area or for a miniature digital television receiver.

Conversely, the organic compound synthesized by R. B. Meyer et al, in 1975 exhibited a ferroelectric property, and further, in 1980 R. B. Meyer suggested the use of a ferroelectric liquid crystal compound as the optical switching element, namely the display device, by filling these ferroelectric liquid crystal compounds in a cell with a small gap.

The switching element using the ferroelectric liquid crystal compound as described above, different from the switching element utilizing the TN mode or the STN mode, functions as a switching element only by changing the alignment direction of the molecules of the liquid crystal compound, whereby the switching time is greatly reduced. Further, since the value of $Ps \times E$ given by the spontaneous polarization (Ps) possessed by the ferroelectric liquid crystal compound and the electrical field intensity (E) is the effective energy strength for changing the direction of alignment of the molecules of the liquid crystal compound, the consumption power is also greatly reduced. Such a ferroelectric liquid crystal compound has two stable states, depending on the direction of the applied electrical field, namely has bistability, and a good switching threshold characteristic, and therefore is particularly suitable as a display device for moving pictures.

When such a ferroelectric liquid crystal compound is used for the optical switching element, the ferroelectric liquid crystal compound must have characteristics such as an actuation temperature range near normal temperature, a wide actuation temperature width, and a high switching speed and switching threshold value voltage within a required range. Especially, the actuation temperature range is very important when using a ferroelectric liquid crystal compound, and the actuation temperature range does not coincide with the service temperature range in many ferroelectric liquid crystal compounds, although the other characteristics may be very good (see, for example, R. B. Meyer et al, J. de Phs., vol. 36 L-p.69, 1975).

Further, in the pre-text of the 11th Liquid Crystal Discussion, p. 16 (1985) reported by Mr. Masaaki Taguchi and Mr. Takamasa Harada or in Japanese Unexamined Patent Publication (Kokai) No. 62-10045, for example, ferroelectric liquid crystal compounds having a naphthalene ring are disclosed. The liquid crystal compounds disclosed have a relatively higher practical applicability from the view point of the actuation temperature range, but they do not satisfy all of the other characteristic requirements for a ferroelectric liquid crystal compound, and there is still room for an improvement thereof.

SUMMARY OF THE INVENTION

Accordingly, the object of the present invention is to provide a novel naphthalene compound which can be used as the liquid crystal compound.

Another object of the present invention is to provide a novel liquid crystal composition which can form a display device having excellent characteristics.

A further object of the present invention is to provide a novel liquid crystal composition capable of forming an element having excellent characteristics such as an actuation temperature range near normal temperature, a wide actuation temperature width, a high switching speed, and a switching threshold value voltage within a required range.

Other objects and advantages of the present invention will be apparent from the following description.

In accordance with the present invention, there is provided a naphthalene compound having the following formula (I), preferably (I'):

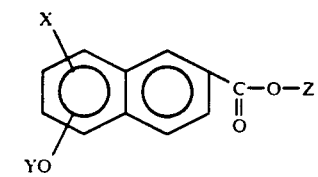
(I)

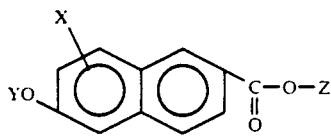
(I')

wherein X represents a hydrogen atom or a halogen atom, Y and Z independently represent a monovalent group selected from the group consisting of

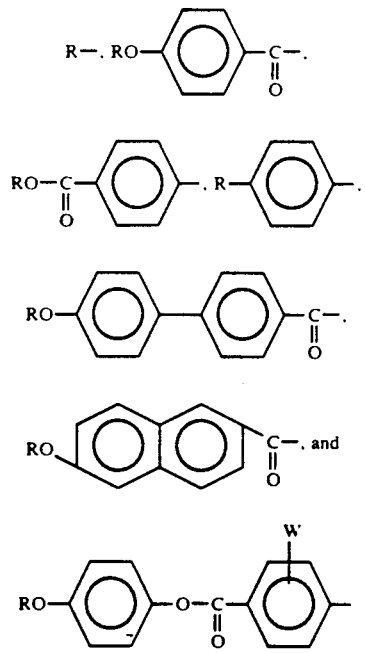

wherein W represents a hydrogen atom or a halogen atom, R represents an alkyl group having 6 to 18 carbon atoms, provided that at least one group of y and Z represents the alkyl group, which is an optically active group including an asymmetric carbon having the following formula (II):

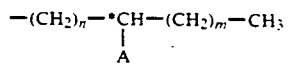
(II)

wherein A is a group or atom selected from the group consisting of alkyl groups, alkoxy groups, halogen atoms and fluoroalkyl groups, n is an integer of 0 to 3, m is an integer of 3 to 6, and *C represents an asymmetric carbon. The term "fluoroalkyl group" used herein means an alkyl group, in which at least one hydrogen atom is substituted with fluorine atom. Example of such a group is trifluoroomethyl ($-CF_3$), monofluoromethyl ($-CFH_2$) or lthe like.

In accordance with the present invention, there is also provided a liquid crystal composition which comprises a naphthalene compound having the following formula (i), preferably (I'):

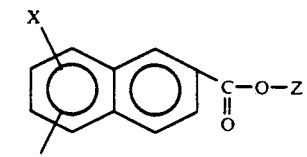
(I)

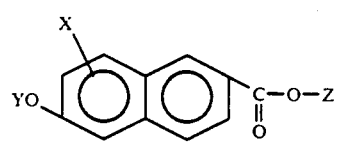
(I')

wherein X represents a hydrogen atom or a halogen atom, Y and Z each independently represent a monovalent group selected from the group consisting of

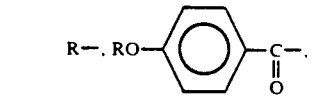

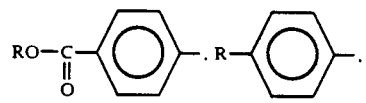

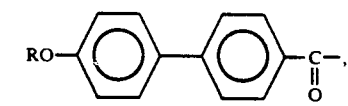

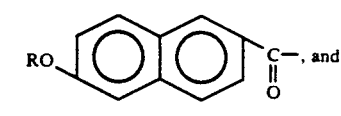

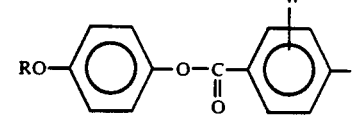

wherein W represents a hydrogen atom or a halogen atom, R represents an alkyl group having 6 to 18 carbon atoms, and the alkyl group consisting at least one alkyl group of Y and Z is an optically active group including an asymmetric carbon having the following formula (II):

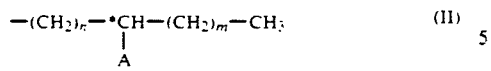

wherein A is a group or atom selected from the group consisting of alkyl groups, alkoxy groups, halogen atoms and fluoroalkyl groups, n is an integer of 0 to 3, m is an integer of 3 to 6, and *C represents an asymmetric carbon.

DESCRIPTION OF THE PREFERRED EMBODIMENTS

The naphthalene compound according to the present invention exhibits the smectic phase at around room temperature, because an alkyl group having 4 to 7 carbon atoms is attached to the optically active carbon.

Therefore, the liquid crystal composition containing a naphthalene compound exhibiting the smectic phase at such a low temperature is practically valuable, since the liquid crystal service temperature is within the required range.

The naphthalene compound according to the present invention has the following formula (I), preferably (I'):

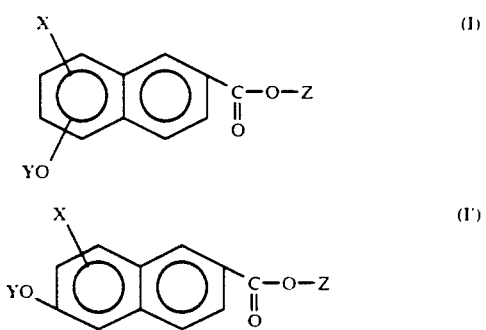

wherein X represents a hydrogen atom or a halogen atom, Y and Z independently represent a monovalent group selected from the group consisting of

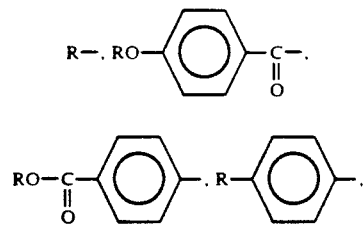

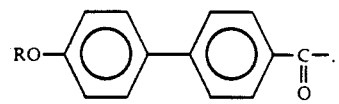

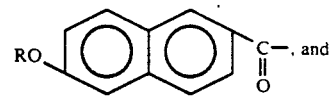

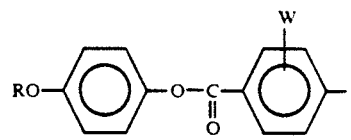

wherein W represents a hydrogen atom or a halogen atom, R represents an alkyl group having 6 to 18 carbon atoms, and the alkyl group constituting at least one alkyl group of Y and Z is an optically active group including an asymmetric carbon having the following formula (II):

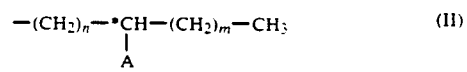

wherein A is a group or atom selected from the group consisting of alkyl groups, preferably those havving 1 to 10 carbon atoms, alkoxy groups, preferably those havving 1 to 10 carbon atoms, halogen atoms (e.g., Cl, Br, I), and fluoroalkyl groups, preferably those having 1 to 10 carbon atoms, and in the above formula (II), n is an integer of 0 to 3, preferably 0 to 1, and m is an integer of 3 to 6, preferably 4 to 5. Therefore, the naphthalene compounds where m is 0 to 2 are not included in the present invention. Since m̲ is the formula (II) is 3 to 6 according to the present invention, the liquid crystal temperature exists near normal temperature and extends a wide range. In the above-mentioned formula (II), *C represents an asymmetric carbon.

Therefore, in the above-mentioned formula (II), the group represented by A cannot be the same as the group represented by $-(CH_2)_m-CH_3$. The group A in the formula (II) is preferably a fluoroalkyl group of alkyl group in the present invention. Especially preferable alkyl group is an ethyl group.

Examples of the napthalene compound according to the present invention represented by the above-mentioned formula (II) are those represented by the following formulae (1) to (49).

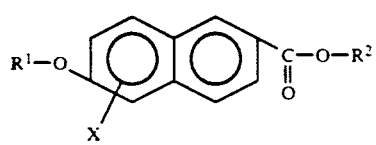

(1)

-continued
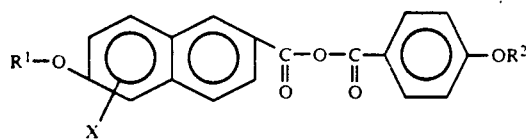 (2)
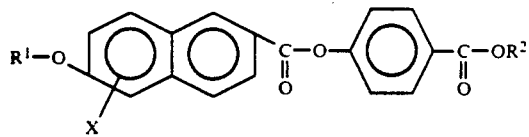 (3)
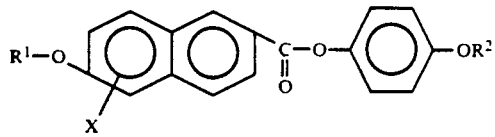 (4)
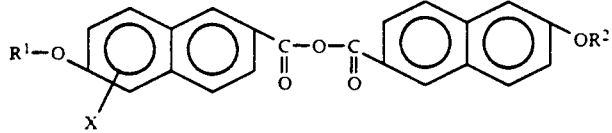 (5)
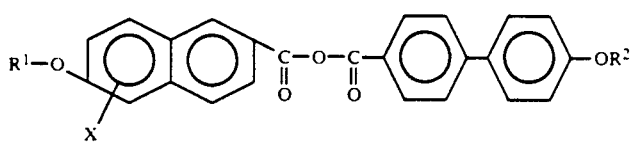 (6)
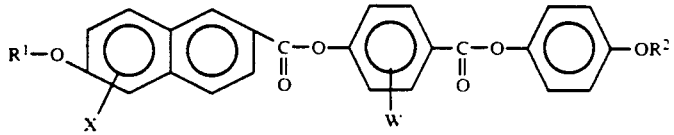 (7)
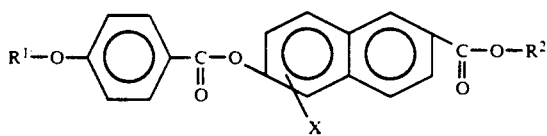 (8)
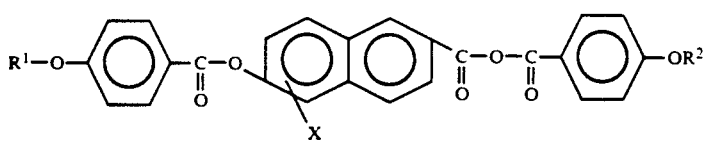 (9)
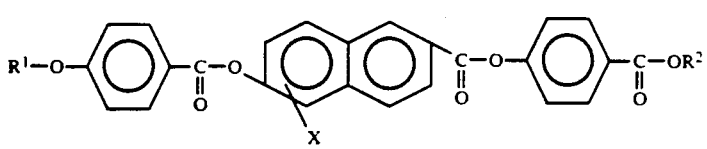 (10)
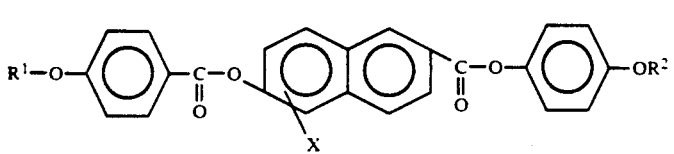 (11)

-continued
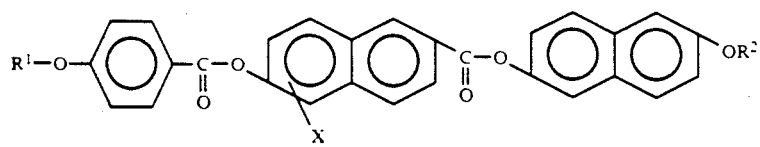 (12)
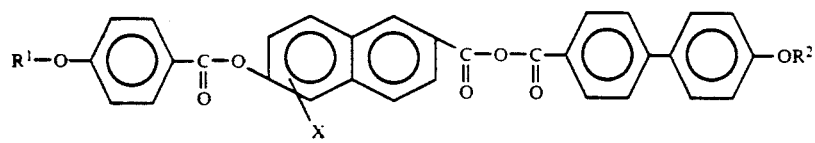 (13)
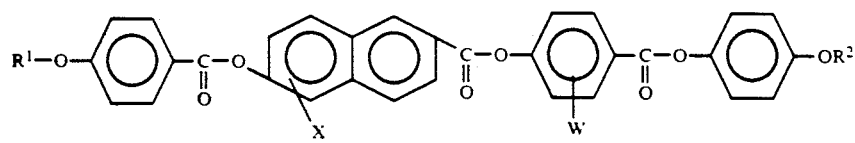 (14)
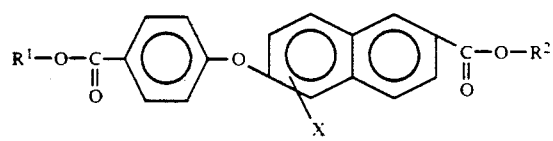 (15)
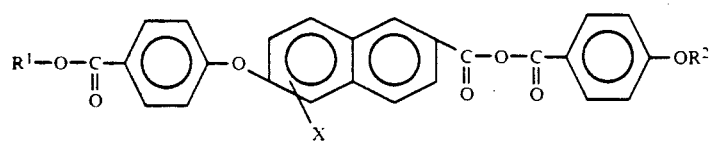 (16)
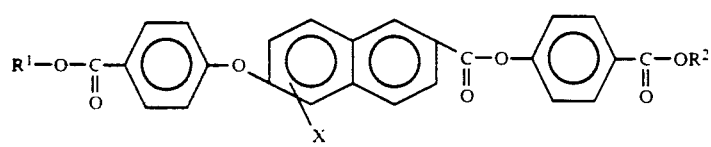 (17)
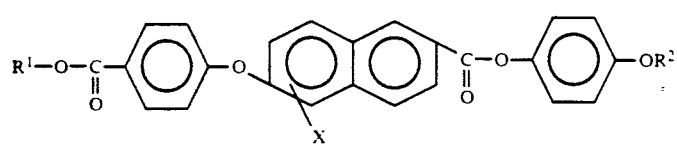 (18)
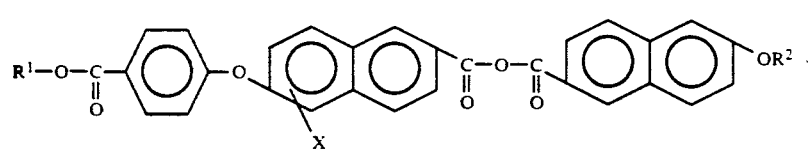 (19)
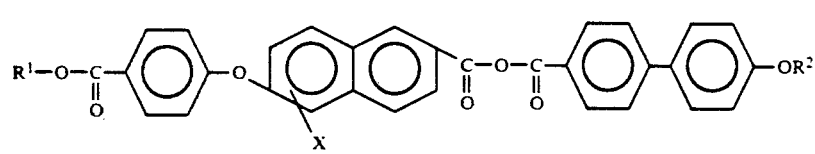 (20)
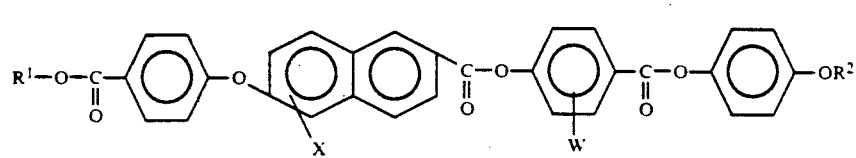 (21)

-continued
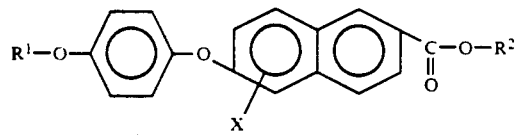
(22)
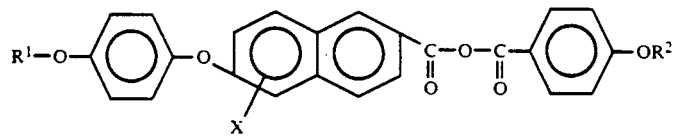
(23)
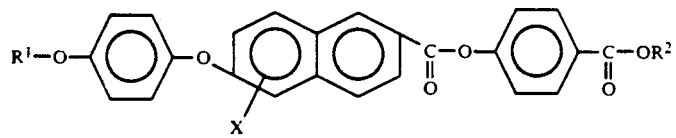
(24)
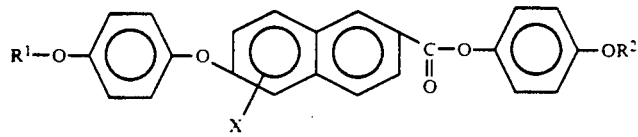
(25)
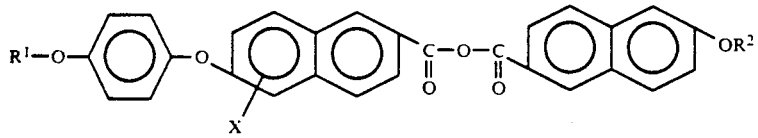
(26)
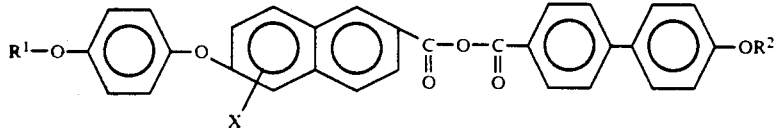
(27)
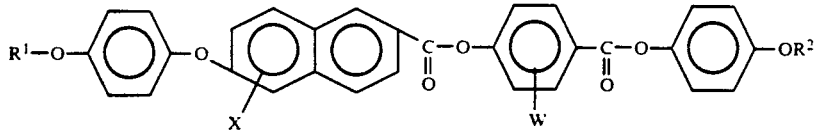
(28)
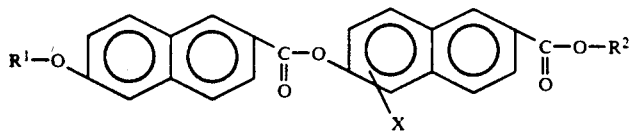
(29)
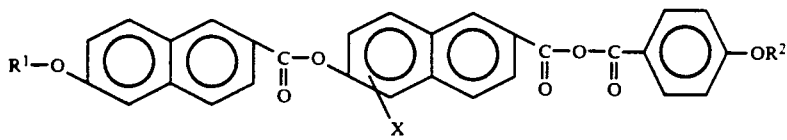
(30)
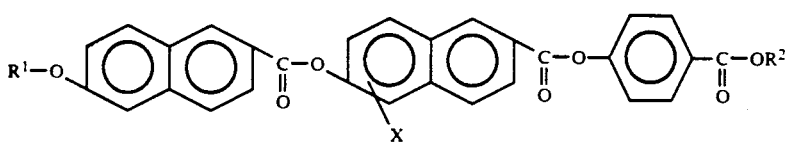
(31)

-continued
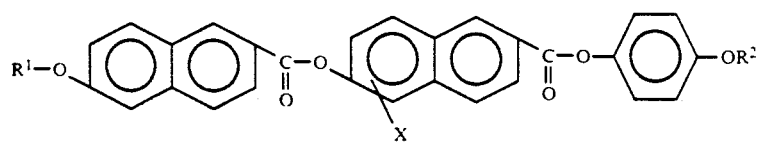 (32)
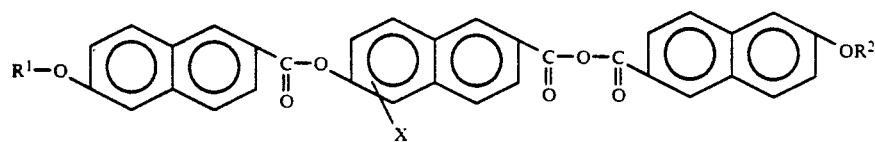 (33)
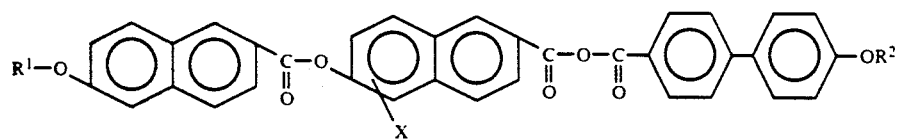 (34)
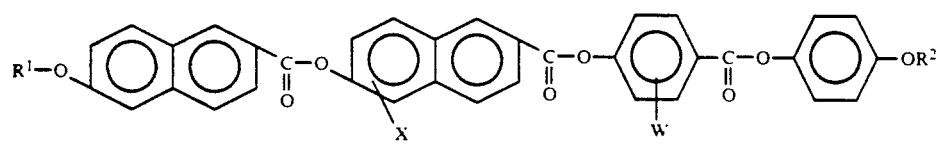 (35)
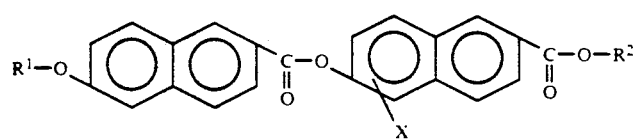 (36)
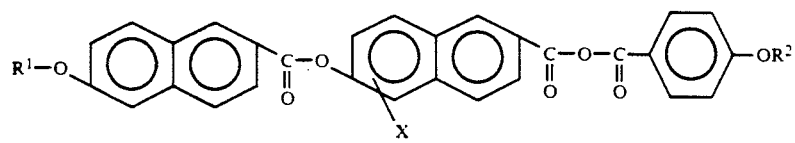 (37)
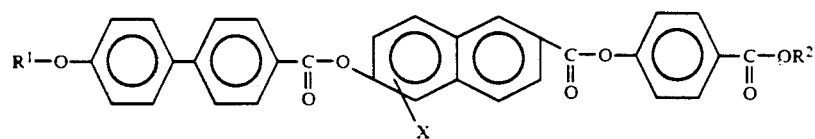 (38)
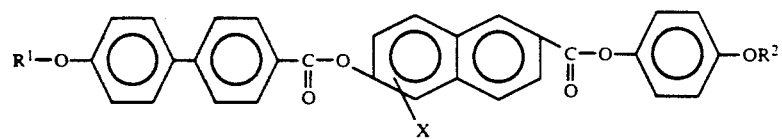 (39)
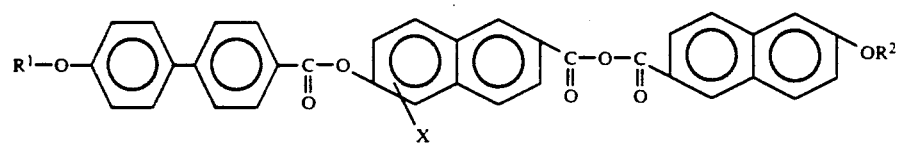 (40)
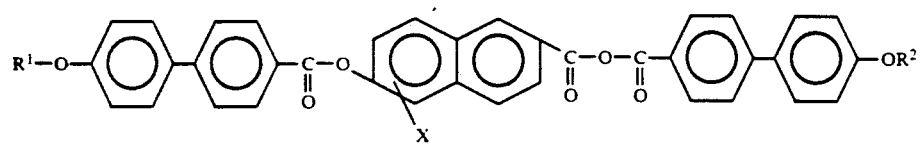 (41)

-continued

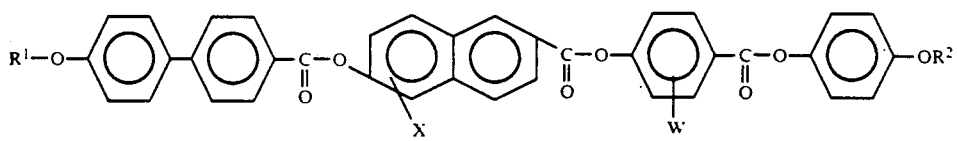  (42)

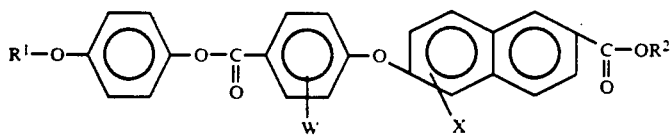  (43)

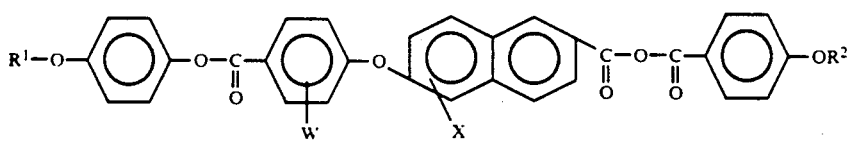  (44)

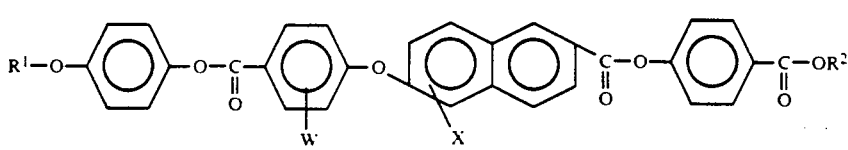  (45)

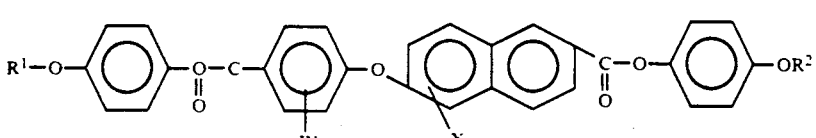  (46)

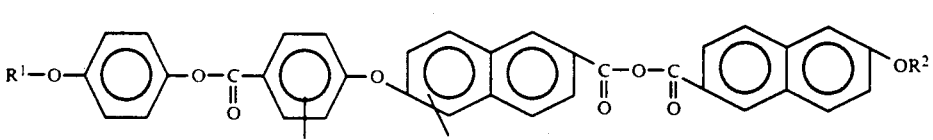  (47)

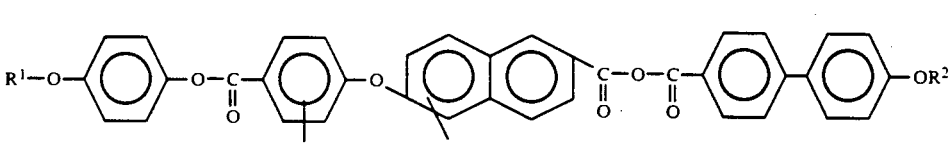  (48)

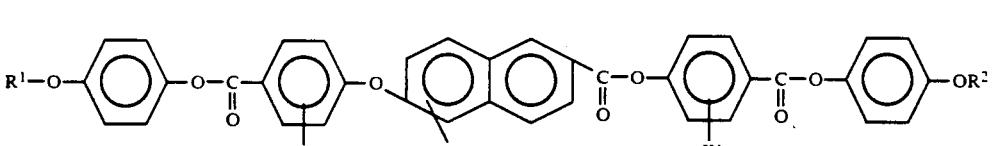  (49)

In the above-mentioned formulae (1) to (49), X and W are each either a hydrogen atom or a halogen atom, each of $R^1$ and $R^2$ represents an alkyl group having 1 to 18 carbon atoms, and either one of $R^1$ and $R^2$ or both of $R^1$ and $R^2$ represent a group having an asymmetric carbon (*C) having the following formula (II):

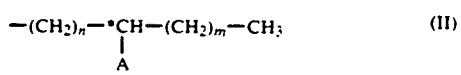  (II)

In the above-mentioned formula (II), A is either a group or atom of alkyl groups, alkoxy groups, halogen atoms and fluoroalkyl groups, n is an integer of 0 to 3, preferably 0 to 1, m is an integer of 3 to 6, preferably 4 to 5, and *C represents an asymmetric carbon.

The compounds particularly preferable as liquid crystal compounds are those having the formula (3), and specifically, the compounds having the following formula (3-a) are particularly preferred.

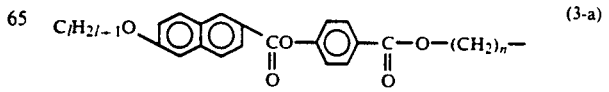  (3-a)

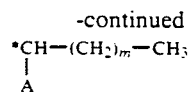

In the above-mentioned formula [3-a], l is an integer of 1 to 18, n is an integer of 0 to 3, m is an integer of 3 to 6, and A is either a group or atom of alkyl groups, alkoxy groups, halogen atoms and fluoroalkyl groups: *C represents an asymmetric carbon.

The naphthalene compound of the present invention can be prepared by utilizing known synthetic techniques.

For example, the compounds represented by the above-mentioned formula (3-a) can be synthesized by following the synthesizing route shown below.

ride in the presence of pyridine to obtain a 4-benzyloxybenzoic acid chloride (IV), which compound (IV) is reached with an alcohol compound having the formula (V) to obtain a compound (VI). The compound (VI) is reduced by hydrogen gas, in the presence of a catalyst such as palladium-carbon, to carry out a debenzylation reaction and obtain a compound (VII).

Separately, 6-alkoxy-2-carboxynaphthalene (VIII) is prepared, and the compound (VIII) is reacted with a chlorinating agent such as thionyl chloride to obtain a compound (IX).

Subsequently, by reacting the above-mentioned compound (VII) with the compound (IX) in the presence of pyridine, the final compound (3-a) can be obtained.

In order that the compound having the formula (3-a) may have optical activity, as the alcohol compound (V),

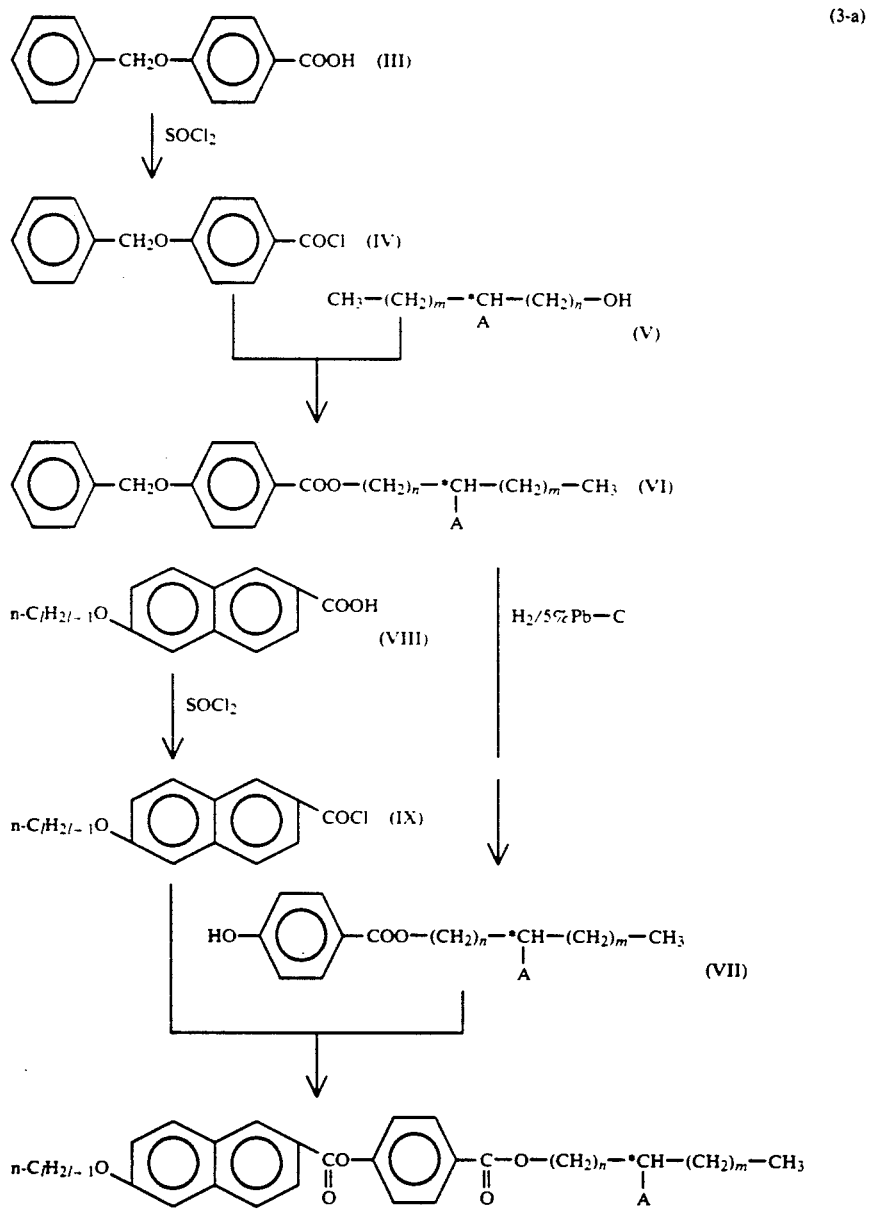

(3-a)

In the above-mentioned formulae, m, n, A, and l are the same as defined above.

More specifically, 4-benzyloxybenzoic acid (III) is reacted with a chlorinating agent such as thionyl chlofor example, there are included 4-undecanol, 3-decanol, 2-nonanol, 3-nonaol, 2-octanol, 3-octanol, 1-chlorooctanol, 1-fluorooctanol, 1,1,1-trichloro-2-octanol, 1,1,1- trifluoro-2-octanol, 2-heptanol, 3-heptanol, 1-chloroheptanol, 1-fluoroheptanol, 1,1,1-trichloro2-heptanol, 1,1,1-trifluoro-2-heptanol, 2-hexanol, 1-chlorohexanol, 1-fluorohexanol, 1,1,1-trichloro-2-hexanol, 1,1,1-trifluoro-2-hexanol, 1-chloropentanol, 1-fluoropentanol.

The naphthalene compound has the naphthalene skeleton at the core portion of the molecule, and therefore, has a specific feature in that the molecule itself has a certain rigidity and that the cohesive force of the molecule as a whole is small.

There are many compounds among such naphthalene compounds which can be used as ferroelectric liquid crystal compounds in switching elements for controlling light transmissivity by, for example, permitting a ferroelectric liquid crystal compound to be interposed between opposed electrodes or magnetic poles and changing the tilt angle of the ferroelectric liquid crystal compound. More specifically, the ferroelectric liquid crystal compound to be used as such a switching element must have the smectic phase at around room temperature, and a value of the spontaneous polarization in the smectic phase (Ps) and a viscosity coefficient within required ranges. Therefore, among the naphthalene compounds mentioned above, the compounds exhibiting the smectic phase can be used as the main agent of the smectic liquid crystal composition to be used as the ferroelectric liquid crystal composition or as the aid for the liquid crystal composition using other compounds exhibiting the smectic phase as the main agent.

Typical examples of such compounds include the compounds having the following formula (X).

Of these compounds, the phase transition point exhibited by the compound having the following formula (X) is shown in the following Table 1. In the Table, C (or Cry) indicates a crystal phase, SmA a smectic A phase, SmC a smectic C phase, Iso an isotropic liquid, and the numerals of the respective phases having the mark * indicate the transfer temperatures from that phase to the phase written on the right thereof.

TABLE 1

(X)

$C_8H_{17}-O-\text{[naphthalene]}-CO-O-\text{[phenyl]}-CO-O-*CH(CH_3)-C_6H_{13}$

| Compound | | C | SmC | SmA | Iso |
|---|---|---|---|---|---|
| [X] | Temperature elevation | • | | | 60° C.* |
| | Temperature drop | • | 20° C.* | 60° C.* | |

As is clear from Table 1, the naphthalene compound has the smectic phase at a temperature around room temperature or lower than room temperature. In the prior art, a large number of liquid crystal compounds having the smectic phase are known, but a compound substantially exhibiting the smectic phase alone at a temperature of 30° C or lower is not known.

For example, the compound having the naphthalene skeleton represented by the following formula (XI):

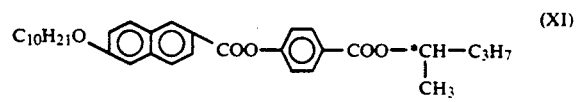

(XI)

wherein the alkyl group bonded to optically active carbon *C is a propyl group, exhibits a liquid crystal phase at 50° C or higher, and does not exhibit a liquid crystal phase at a lower temperature.

In contrast, the naphthalene compound of the present invention wherein the alkyl group bonded to the optically active carbon *C is a butyl, pentyl, hexyl or heptyl group exhibits the smectic phase at a low temperature (e.g. 20° C) which cannot be obtained with the naphthalene compounds of the prior art.

Therefore, the naphthalene compound of the present invention can be used alone as the liquid crystal compound or as a mixture with another liquid crystal compound, as long as the liquid crystal phase temperature range of the other liquid crystal compound can be lowered to around room temperature.

The liquid crystal composition will now be described.

The liquid crystal composition of the present invention contains the naphthalene compound represented by the above-mentioned formula (I).

In the liquid crystal composition of the present invention, the content of the compound represented by the above-mentioned formula (I) can be as required in view of the characteristics of the substituted naphthalene compound used, the viscosity of the composition, the actuation temperature, and the use thereof.

In the liquid crystal composition according to the present invention, examples of the compounds exhibiting the chiral smectic C phase which can be formulated together with the liquid crystal compound represented by the formula (I) include (+)-4'-(2''-methylbutyloxy) phenyl-6-octyloxy-napthalene-2- carboxylic acid ester, 4'-decyloxyphenyl-6-((+)-2''-methylbutyloxy) naphthalene-2-carboxylic acid ester,

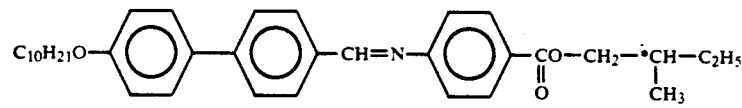

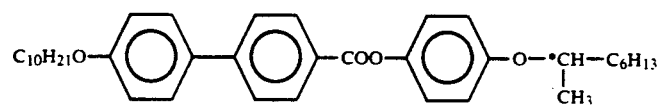

and

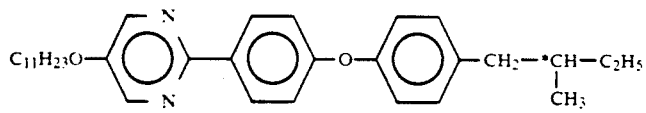

Further, examples of compounds other than the compounds exhibiting the chiral smectic C phase, which can be formulated with the substituted naphthalene compound having the formula (I) as described above to constitute the liquid crystal composition of the present invention include nematic liquid crystal compounds typically represented by Schiff base type liquid crystal compounds such as:

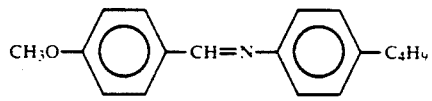

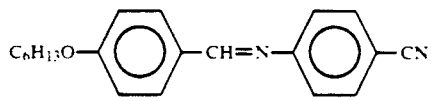

azoxy type liquid crystal compounds such as:

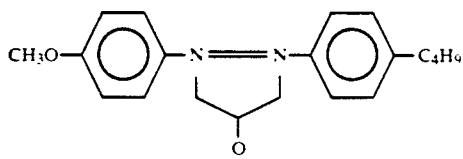

benzoic acid ester type liquid crystal compounds such as:

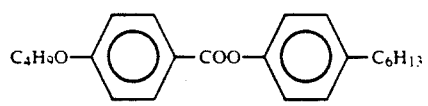

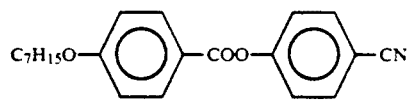

cyclohexylcarboxylic acid ester type liquid crystal compounds such as:

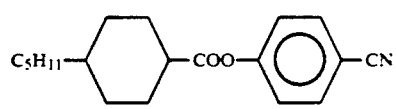

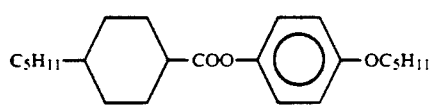

biphenyl type liquid crystal compounds such as:

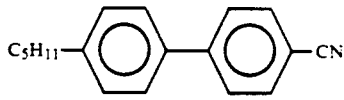

terphenol type liquid crystal compounds:

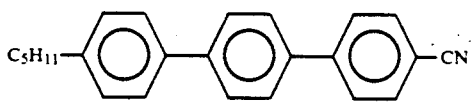

cyclohexyl type liquid crystal compounds:

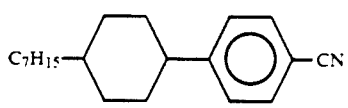

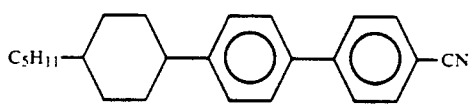

and pyridine type liquid crystal compounds such as;

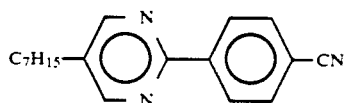

and further, cholesteric type liquid crystal compounds such as cholesterine hydrochloride, cholesterine nonanooate, and cholesterine oleate, and known smectic liquid crystal compounds.

The liquid crystal composition according to the present invention may also contain additives which can be formulated in conventional liquid crystal compositions, such as an electroconductivity imparting agent and life enhancer.

As examples of the display method using the liquid crystal composition of the present invention, the following methods may be specifically employed.

In the first method a display is effected by utilizing two polarizing plates and birefringence of a ferroelectric liquid crystal compound, in which the liquid crystal composition is injected into a thin film cell having a gap of, for example, 2 to 5 μm, the ferroelectric compound is aligned in parallel to the substrate by utilizing the regulating force of the substrate, interposing the thin film cell having the liquid crystal composition injected therein between two polarizing plates, and an external electrical field is applied to the thin film cell, to thereby change the alignment vector of the ferroelectric liquid crystal compound. The electrode to be used in this case preferably has silica obliquely vapor-deposited thereon.

The second method utilizes the bichrome characteristic by mixing the liquid crystal composition of the present invention with a bichrome dye, and in this method a display is effected by changing the absorption of light with the dye by changing the direction of alignment of the ferroelectric liquid crystal composition. The dye to be used in this case is generally a bichrome dye, and examples of such a bichrome dye include azo dyes, naphthoquinone type dyes, cyanine type dyes, and anthraquinone type dyes.

The liquid crystal composition according to the present invention also can be employed according to a display method conventionally utilized, other than the above-mentioned display methods.

The display device produced by using the liquid crystal composition can be driven by drive systems for electrical address display, optical address display, heat address display, and electron beam address, including a static drive, a simple matrix drive, and a composite matrix drive.

Due to the presence of an alkyl group having 4 to 7 carbon atoms bonded to an optically active carbon, the naphthalene compound according to the present invention exhibits the smectic phase at around room temperature, and therefore, the liquid crystal composition containing a naphthalene compound exhibiting the smectic phase at such a low temperature is advantageous because the liquid crystal service temperature is within a required range.

Also, the liquid crystal composition containing the naphthalene compound as described above has a value of spontaneous polarization and a viscosity coefficient within required ranges, and therefore, in the display method using the smectic liquid phase composition, a high speed response of some 10 μsec or lower can be obtained. Therefore, by using the smectic liquid crystal composition as the switching element for a display device having a large picture area with a large number of scanning lines, due to the short time required for each scanning, a display of large picture area having a sharp contrast can be obtained.

Also, by preparing a thin film cell by using the smectic liquid crystal composition and forming the smectic phase within the thin layer cell, due to the spontaneous polarization possessed by the liquid crystal compound, the thin layer cell can act as a memory, and thus a continuous application of voltage is not required and a reduction in the power consumed for the display can be obtained. Further, in this case, the contrast becomes very sharp.

The switching element using the smectic liquid crystal composition can be switched only by changing the direction of alignment of the molecules, and the primary item of electrical field intensity acts on the drive, whereby a low voltage primary drive can be obtained.

Accordingly, of the liquid crystal compositions provided by the present invention, by using the smectic liquid crystal composition, a display for a large picture area having a lower consumption power and sharper contrast can be produced.

Further, due to the short drive time and low drive voltage, the composition also can be used as a switching element for a display device for moving pictures.

EXAMPLES

The present invention will now be further illustrated by, but is by no means limited to, the following Examples.

EXAMPLE 1

Synthesis of 2-[4'(R-1''-methylheptylcarbonyl)-phenyloxy]-6-decyloxynaphthalene

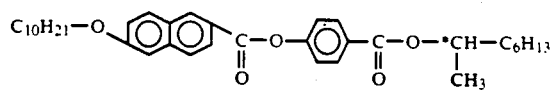

First step

Amounts of 11.4 g (50 mmole) of 4-benzyloxybenzoic acid, 36.6 ml (0.5 mole) of thionyl chloride, and 0.1 ml of DMF were mixed and stirred at 70° C for 2 hours, followed by heating under reflux for one hour.

After the refluxing, unreacted thionyl chloride was obtained to give 4-benzyloxybenzoic acid chloride of the desired product.

Second step

An amount of 12.3 g (50 mmole) of 4-benzyloxybenzoic acid chloride obtained in the first step was dissolved in 100 ml of THF, and separately, a mixture of 6.5 g (50 mmole) of R-2-octanol and 60.4 ml (0.75 mmole) of pyridine was prepared, and the above THF solution of 4-benzyloxybenzoic acid chloride was added dropwise to the mixture while stirring.

After the dropwise addition, stirring was continued for 24 hours, and thereafter, the reaction mixture was thrown into water and the reaction product was extracted with ether.

From the ether solution obtained, ether was removed and the residue obtained was recrystallized by a hexane solvent to obtain 12.84 g (37.8 mmole) of 1'-methylheptyloxy-4-benzyloxybenzoate of the desired product.

Third step

Amounts of 12.84 g (37.8 mmole) of 1'-methylheptyloxy-4-benzyloxybenzoate, 2.49 g of carbon having 5% weight of palladium carried thereon, and 150 ml of ethanol were mixed, and hydrogen gas was bubbled therein under normal pressure for 8 hours.

Subsequently, the reaction mixture was filtered to remove the catalyst, and the filtrate was concentrated to obtain 9.57 g (37.8 mmole) of 1-methylheptyloxy-4-hydroxybenzoate.

Fourth step

Separately, 0.66 g (2 mmole) of 6-decyloxy-2-carboxy-naphthalene was mixed with 1.5 ml (20 mmole) of thionyl chloride and 0.02 ml of DMF and stirred at 70° C for 2 hours, followed by heating under reflux for 1 hour.

Subsequently, by removing unreacted thionyl chloride, 6-decyloxynaphthalene-2-carboxylic acid chloride of the desired product was obtained.

Fifth step

Amounts of 0.69 g (2 mmole) of 6-decyloxynaphthalene-2-carboxylic acid chloride, 0.6 g (4 mmole) of 1'-methylheptyloxy-4-hydroxybenzoate, and 2.41 ml (30 mmole) of pyrinde were added to 20 ml of THF and stirred at 40° C for 3 hours, followed by throwing the reaction mixture into water.

The reaction product was extracted with ether, washed with water, and concentrated.

The concentrate obtained was separated by column chromatography to obtain 0.56 g of 2-[4'(R-1"-methylheptylcarbonyl)phenyloxy]-6-decyloxy-naphthalene of the final product. $^1$H-NMR of the compound obtained was measured. $^1$H-NMR (270 MHz, CDCl$_3$)

δ(ppm) 0.8-1.0 (m, 9H, —CH$_3$)
1.2-2.0 (m, 26H)
4.0-4.2 (t, 2H, —O—CH$_2$—)
5.1-5.2 (d, 1H, —O—CH—)
7.2-8.2 (m, 10H, aromatic)

From the above 1H-NMR results, the compound obtained was confirmed to be 2-[4'(R-1"-methylheptylcarbonyl)phenyloxy]6-decyloxynapthalene.

The phase transition temperatures of this compound are shown as follows:

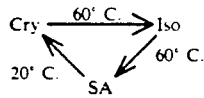

EXAMPLE 2

Synthesis of
2-[4'(R-1"-trifluoromethylheptyloxycarbonyl]-6-decyloxynaphthalene

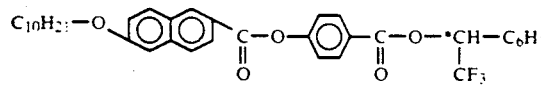

The desired compound was obtained in the form of a white solid powder in the same manner as in Example 1, except that 1,1,1-trifluoro-R-2-octanol was used instead of the R-2-octanol. From the mass spectrum data, i.e., MS: M/e=614(P), it was confirmed that the desired compound was obtained.

The phase transition temperatures of this compound are shown as follows:

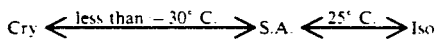

This compound possesses a wider liquid crystal temperature range extending from room temperature to a lower temperature side, when compared with 2-[4'(R-2"-methylbutyloxycarbonyl)phenyloxycarbonyl]-6-decyloxynaphthalene disclosed in Japanese Unexamined Patent Publication (Kokai) No. 62-10045:

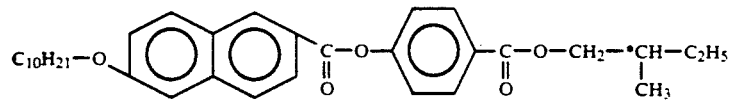

having the following phase transition temperatures:

That is, when m is 3 to 6 in the formula (II), the liquid crystal temperature range exists near normal temperature and extends a wider range.

EXAMPLE 3

Synthesis of 2-4'(R-1"-ethylhexyloxycarbonyl)phenyloxycarbonyl]-6-decyloxynaphthalene

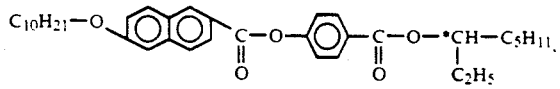

The desired compound was obtained in the form of a white solid powder in the same manner as in Example 1, except that R-3-octanol was used instead of R-2-Octanol.

From the mass spectrum data, i.e., MS:M/e=560 (P), it was confirm that the desired compound was obtained.

The phase transition temperatures of this compound are shown as follows.

EXAMPLE 4

Synthesis of 2-[6'(R-1"-methylheptyloxycarbonyl)naphthyloxycarbonyl]-6-decyloxynaphthalene

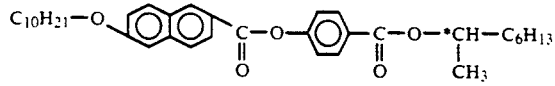

The desired compound was obtained in the form of a white solid powder in the same manner as in Example 1, except that 2-benzyloxynaphthalene-6-carboxylic acid was used instead of 4-benzyloxybenzoic acid.

From the mass spectrum data, i.e., MS:M/e=610, it was confirm that the desired compound was obtained.

The phase transition temperatures of this compound are shown as follows.

EXAMPLE 5

When 11 parts by weight of the compound prepared in Example 2 was mixed with 89 parts by weight of a known strong dielectric liquid crystal ZLI-3488 (available from Merck & Co., Inc), the phase transition temperatures of the resultant mixture were as follows:

As is clear from the above-results, the compound prepared in Example 2 is useful for widening the smectic liquid crystal phase. The phase transition temperatures of the above-mentioned known strong dielectric liquid crystal ZLI-3488 are as follows:

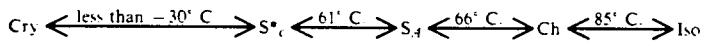

The compounds in which group A is (II) fluoroalkyl or ethyl as those prepared in Examples 2 and 3 possess a wider liquid crystal temperature range extending from room temperature to a lower temperature side when compared with the compounds disclosed in Japanese Unexamined Patent Publication (Kokai) No. 62-10045. Namely, when m is 3 to 6 in the formula (II); the liquid crystal temperature exists near normal temperature and extends a wider range.

We claim:

1. A naphthalene compound of the formula (I):

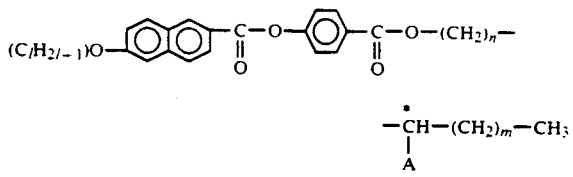

wherein A represents $CF_3$, n is an integer of 1 to 3, m is an integer of 3 to 6 is an integer of 6 to 18.

2. A liquid crystal composition comprising a naphthalene compound as claimed in claim 1.

* * * * *